May 17, 1949.  C. J. McNAMARA  2,470,218
TOOL HOLDER
Filed Feb. 24, 1945
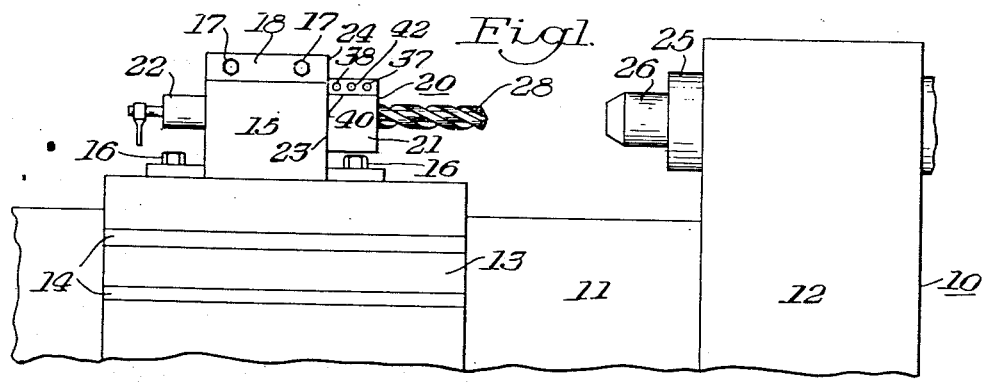
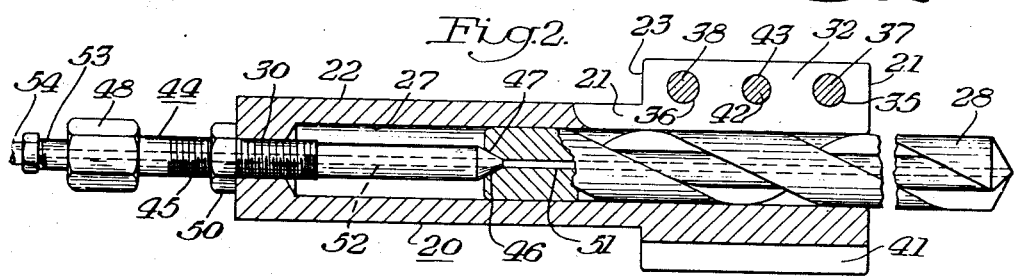
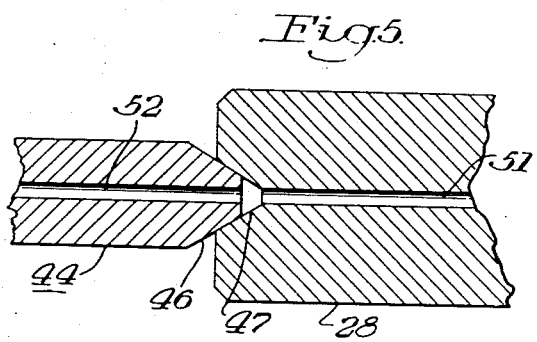
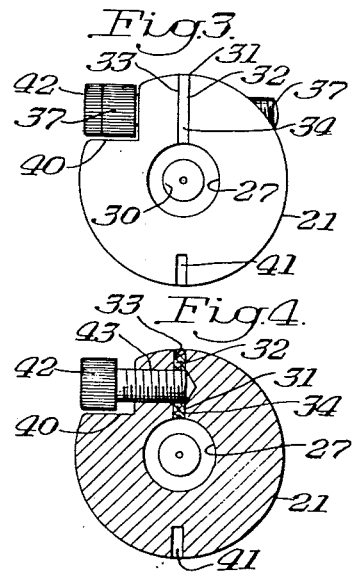
INVENTOR.
Charles J. McNamara
BY Edward L. Laurence
his Attorney Patented May 17, 1949

2,470,218

UNITED STATES PATENT OFFICE 2,470,218

TOOLHOLDER

Charles J. McNamara, Crafton, Pa., assignor to N. R. McNamara and C. F. Coate, doing business as Precision Instrument & Manufacturing Company, Pittsburgh, Pa., a partnership Application February 24, 1945, Serial No. 579,531

5 Claims. (Cl. 279—46)

1

This invention relates generally to tool holders and more particularly to a holder for mounting tools in a spindle or in a clevis on the turret of a lathe.

The principal object is the provision of a tool holder in which tools may be readily inserted and withdrawn without wear on the mating surfaces of the holder and the tool.

Another object is the provision of a tool holder for accurately centering and holding a tool.

Another object is the provision of a lathe tool holder having gauge surfaces for setting the tool relative to the work piece.

Another object is the provision of an adjustable stop in the tool holder for properly positioning a tool relative to the work piece.

Another object is the provision of a tool stop in a tool holder arranged to supply a cutting lubricant to a hollow tool.

Cleves are employed on the turrets of most of the production lathes of the automatic type supporting tool holders. The present type of tool holder is provided with a bore substantially the same diameter as the tool shank and employs one or more set screws to engage and lock the tool in place. A bump roll or other means is required to dislodge the tool from the holder for replacing a sharpened or new tool. In automatic lathes, such as employed for turning forty millimeter projectiles and the like, it is necessary to frequently remove the cutting or boring tools to replace or sharpen them because of the high production required of the machine. The set screw of the tool holder is loosened and the tool is bumped out by means of a rod and hammer. When the tool is replaced it usually has to be bumped into position and accurately gauged relative to the work piece to properly perform its work. The frequent removal and insertion of a tool in this manner wears and scores the surface of the shank of the tool and the bore of the tool holder. Marks and burrs made by the set screws on the tool shank also score the bore of the tool holder, increasing the wear thereon which frequently requires replacement. Again it is impossible to properly center a tool in a holder that is scored and worn a few thousandths of an inch and many work pieces may be improperly machined before the off center error is detected. The tool holder comprising this invention eliminates all of these disadvantages and the operator replacing a tool therein need not have the skill of a highly trained mechanic. The improved tool holder comprising this invention provides

2 increased production and an improved machining of the product.

Other objects and advantages appear hereinafter in the following specification and claims.

A practical embodiment illustrating the principles of this invention is shown in the accompanying drawing wherein:

Fig. 1 is a side elevation showing parts of an automatic lathe having the work piece and tool holder mounted therein.

Fig. 2 is a longitudinal sectional view of the tool holder showing a tool clamped therein.

Fig. 3 is an end view of the tool holder with the tool removed.

Fig. 4 is a transverse sectional view of the tool holder clamping head showing the expanding screw.

Fig. 5 is an enlarged sectional view of a tool end and the stop screw in engagement with each other for the transmission of lubricant to the hollow tool.

Referring to the drawing, a portion of an automatic lathe 10 is shown wherein the cylindrical carriage 11 is arranged to reciprocate in the lathe head 12 and carries the turret 13 which is provided with an annular series of slots 14 to which the tool chucks or cleves 15 are secured by means of the clamping bolts 16. The upper portion of the clevis 15 is slotted longitudinally of the bore passing therethrough and the sections are provided with transverse holes to receive the clevis clamping bolts 17 that pass transversely through the slot and the bolt heads abut against the flat face 18 to draw the sections of the clevis together.

The tool holder 20 is provided with the enlarged head 21 and the shank 22. The latter fits the bore in the clevis 15 and the radial shoulder 23 between the shank and the head engages the face 24 of the clevis 15.

The head 12 of the lathe is provided with a circular series of rotary driven spindles, one of which is shown at 25. These spindles contain collets for receiving and clamping the work pieces 26 in machining position. The work piece may be formed on the end of the bar or tube stock which is cut off when the machining operation has been completed on the work piece. The collet is then released and the stock fed to a gauged position for producing the next work piece. On the other hand individual work pieces may be chucked separately in the spindles instead of being formed from bar or tubular stock.

The annular series of spindles 25 are arranged to be indexed about the axis of the cylindrical carriage 11 and the work pieces may be operated on at each position by an opposed tool carried on the turret. Thus the tools must be accurately aligned with the work piece at each station or position and slight misalignment would spoil the work piece. The axis of the bore of the clevis 15 is thus accurately aligned with the axis of spindle 25 and the shank 22 of the tool holder must be accurately formed concentric to its bore 27 which is substantially the same diameter as the tool 28 to accurately maintain axial alignment between the tool and the work piece. The tool shown is a twist drill.

The head 21 and the shank 22 of the tool holder 20 are integral and the bore 27 enters and passes through the head and the shank adjacent the end of the latter which is provided with a concentric threaded hole 30 which is smaller in diameter than the bore 27.

The enlarged cylindrical head 21 is divided into two sections by the radial slot 31 from the bore 27 to exterior on one side of the head and extending longitudinally into the shank, forming spaced parallel surfaces 32 and 33. As shown in Fig. 3 the slot 31 is provided with a resilient gasket 34 which fills the slot and prevents the escape of liquid from the bore of the tool holder.

Spaced transverse holes 35 and 36 are formed through the head sections normal to and passing through the parallel surfaces 32 and 33 to receive the bolts 37 and 38. One section of the head is notched out as shown at 40 to form surfaces disposed at right angles to one another to receive the bolt heads and provide an abutment therefor. The holes 35 and 36 in the section of the tool holder head having the notch 40 are drilled to provide clearance for the threads of the bolts 37 and 38 and the holes in the other section are threaded to permit the bolts 37 and 38 to be tightened against one face of the notch 40 to draw the head sections together, thus partially closing the slot 31 to tightly clamp the tool 28 in the bore of the tool holder. A longitudinal slot 41 is cut in the exterior surface of the head 21 diametrically from the slot 31 to provide greater flexibility in contracting and expanding the sections of the tool holder head 21. This slot 41 is not as deep as the shoulder 23 which extends to the surface of the shank 22 as shown in Fig. 2.

When the tool 28 is to be removed from the tool holder 20 the bolts 37 and 38 are loosened but the tool snugly fits the bore 27 and prevents the former from being readily moved or withdrawn. It is then necessary to screw up the bolt 42 in the threaded hole 43, causing it to abut the surface 32 of the slot 31 and further force by the bolt 42 spreads the sections of the head 21, thus permitting the tool to be easily adjusted or withdrawn by hand. When the tool holder is thus expanded the tools may be readily inserted or withdrawn but they are tight in the bore 27 when the spreading bolt 42 is retracted and the tools are tightly clamped in the bore when the clamping bolts 37 and 38 are tightened.

The tool stop 44 is externally threaded, for a portion of its length, as indicated at 45, to fit the threaded hole 30. The inner end of the stop 44 is frusto conical in shape, as shown at 46, to fit the conical socket 47 in the end of the tool shank 28. Thus rotation of the tool stop 44, by applying a wrench on the non-round section 48, permits micrometer adjustment of the tool stop 44 by the fine threads 45 to accurately adjust the longitudinal position of the tool which bears against the stop. A gauge may be employed from three points, the front face of the tool holder head or the clevis face 24, or the front face of the turret 13, to the tip or cutting surface of the tool to properly gauge the tool before it is clamped in place. If the expanding bolt 42 is retracted the stop screw may be used to move the tool to the gauge. The tool stop 44 may then be made to engage the tool and be locked by the nut 50. The tool is then clamped by the bolts 37 and 38 and is ready for service.

The tool 28 is hollow, being bored out as indicated at 51 for the purpose of feeding lubricant to the cutting end of the tool. The bore 51 connects with the bore 52 in the tool stop 44 at the frusto conical socket between these members. The outer end of the tool stop 44 is provided with a fitting 53 for securing a flexible hose 54 which conducts the cutting lubricant under pressure from a suitable source of supply to the bore 52. The frusto conical socket connecting the tool stop and the tool provide a very good joint for transmitting liquid under pressure as well as providing an abutment between the stop and the tool. However if this joint should leak the gasket 34 in the slot 31 will prevent the escape of the lubricant from the tool holder if the slot is exposed to the bore 27 when the shank of the tool is short. By sealing the tool holder in this manner any leak in the frusto conical joint will cause the bore to fill up and prevent any pressure drop in the lubricant delivered through the tool to the cutting edges.

I claim:

1. In an integral rotary tool holder the combination of a shank the perimetral surface of which is arranged to mate with the tool holder receiving surface of a machine, a split head on the outer end of the shank, a bore extending through the head into the shank and concentric to the latter to receive a tool having substantially the same diameter as the bore, means to contract the split head and clamp the shank of the tool in the bore independent means for expanding the head after the clamping means has been retracted to release the tool from the chuck, a threaded opening in the shank end of the tool chuck, a stop screw fitting the threaded opening and arranged to engage the inner end of the tool, and a nut to lock the stop screw and gauge the insertion of the tool in the bore.

2. In an integral rotary tool holder the combination of a shank the perimetral surface of which is arranged to mate with the tool holder receiving surface of a machine, a split head on the outer end of the shank, a bore extending through the head into the shank and concentric to the latter to receive a hollow tool having substantially the same diameter as the bore, a socket at the shank end of the hollow tool, means to contract the split head and clamp the shank of the tool in the bore, independent means for expanding the head after the clamping means has been retracted to release the tool from the chuck, a threaded opening in the shank end of the tool chuck, a hollow stop screw fitting the threaded opening and having a mating portion arranged to engage the socket on the inner end of the tool, a nut to lock the stop screw and gauge the insertion of the tool in the bore, and means to supply a cutting lubricant to the outer end of the stop screw for transmission through the tool to the cutting end thereof.

3. In an integral rotary tool holder the combination of a shank portion arranged to be secured to a machine, a head on the outer end of the shank, a bore extending through the head into the shank to receive a tool having substantially the same diameter as the bore, means defining a radial slot from the bore to the exterior on one side of the head and extending longitudinally into the shank to form spaced parallel surfaces, a resilient gasket in said slot, means to draw the surfaces toward one another to clamp the tool in the bore and compress the gasket to seal the bore, and means to force said surfaces away from one another to release the tool when the first mentioned means is inactive.

4. In an integral rotary tool holder the combination of a shank portion arranged to be secured to a machine, a head on the outer end of the shank and larger in diameter than the shank to produce a radial gauge shoulder, a bore extending through the head into the shank to receive a tool having substantially the same diameter as the bore, means defining a radial slot from the bore to the exterior on one side of the head and extending longitudinally into the shank to form spaced parallel surfaces, a second longitudinally disposed radial slot in the perimetral surface of the head diametrically from the first slot but stopping short of the bore and of less depth than the radial gauge shoulder, means to draw the surfaces toward one another to clamp the tool in the bore, and means to force said surfaces away from one another to release the tool when the first mentioned means is inactive.

5. In an integral rotary tool holder the combination of a shank portion, an enlarged head portion integral with the shank and providing a radial annular shoulder therebetween, a bore extending through the head and into the shank to receive a tool of substantially the same diameter, the radial section of the head being heavier on one side than on the other, a radial slot splitting the heaviest section of the head and extending longitudinally of the bore into the shank, a bolt bridging the slot having a clearance hole in one portion of the head and threaded into an aligned tapped hole in the other portion of the head for clamping the tool in the bore, and a second bolt threaded in a parallel tapped hole in one portion of the head and bridging the slot to abut the other portion of the head to release the tool when the first bolt is not in clamping position.

CHARLES J. McNAMARA.

REFERENCES CITED

The following references are of record in the file of this patent:

UNITED STATES PATENTS

| Number | Name | Date |
|---|---|---|
| 315,326 | Parsons | Apr. 7, 1885 |
| 600,747 | Sverson | Mar. 15, 1898 |
| 770,273 | Dyer | Sept. 20, 1904 |
| 952,158 | Waltie | Mar. 15, 1910 |
| 1,009,302 | Hanson | Nov. 21, 1911 |
| 1,264,429 | Nossagk | Apr. 30, 1918 |
| 1,368,797 | Heck | Feb. 15, 1921 |
| 1,449,475 | Wheeler | Mar. 27, 1923 |
| 1,760,310 | Miller | May 27, 1930 |
| 2,277,816 | Brown | Apr. 20, 1931 |
| 2,396,504 | Grey | Mar. 12, 1946 |